United States Patent
Palanivel et al.

(10) Patent No.: US 9,628,635 B1
(45) Date of Patent: Apr. 18, 2017

(54) SYSTEMS AND METHODS FOR HALFTONE FREQUENCY DETECTION

(71) Applicant: XEROX CORPORATION, Norwalk, CT (US)

(72) Inventors: Dhevendra Alagan Palanivel, Chennai (IN); Sainarayanan Gopalakrishnan, Chennai (IN); Vignesh Doss, Theni (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/198,331

(22) Filed: Jun. 30, 2016

(51) Int. Cl.
- H04N 1/405 (2006.01)
- H04N 1/00 (2006.01)
- H04N 1/40 (2006.01)

(52) U.S. Cl.
CPC ..... *H04N 1/00005* (2013.01); *H04N 1/00037* (2013.01); *H04N 1/00068* (2013.01); *H04N 1/40075* (2013.01)

(58) Field of Classification Search
None
See application file for complete search history.

(56) References Cited

U.S. PATENT DOCUMENTS

| | | |
|---|---|---|
| 6,185,328 B1 | 2/2001 | Shiau |
| 6,185,335 B1 | 2/2001 | Karidi et al. |
| 6,229,923 B1 * | 5/2001 | Williams ........... G06K 9/00456 382/173 |
| 6,683,702 B1 | 1/2004 | Loce et al. |
| 6,734,991 B1 | 5/2004 | Schweid |
| 7,365,882 B2 * | 4/2008 | Curry ................. H04N 1/40075 358/3.07 |
| 7,518,755 B2 * | 4/2009 | Gotoh ................ H04N 1/40062 358/1.9 |
| 7,773,776 B2 * | 8/2010 | Adachi .............. H04N 1/40062 358/2.1 |
| 8,184,340 B2 | 5/2012 | Loce et al. |
| 8,345,310 B2 * | 1/2013 | Adachi .............. H04N 1/40062 358/3.06 |
| 9,147,262 B1 * | 9/2015 | Li ............................ G06T 7/41 |
| 9,288,364 B1 * | 3/2016 | Gopalakrishnan . G06K 15/1822 |
| 2013/0063786 A1 * | 3/2013 | Mizutani .............. H04N 1/4051 358/3.22 |

* cited by examiner

*Primary Examiner* — Dung Tran (57) ABSTRACT

Embodiments of the present disclosure disclose methods and systems for halftone frequency detection in a halftone image. The method includes receiving a first window, a second window, and the halftone image having a predetermined resolution; assigning an active value to a max variable and a min variable associated with each pixel within a first pixel neighborhood defined by the first window based on a pixel intensity value being compared with a three-way threshold set determined based on values a plurality of predetermined statistical parameters; estimating a first frequency estimate and the second frequency estimate based on a number of pixels having active values in the max variable and the min variable respectively within a second pixel neighborhood defined by the second window; and determining the halftone frequency based on the first frequency estimate value, the second frequency estimate value, and the predetermined resolution.

18 Claims, 3 Drawing Sheets

SYSTEMS AND METHODS FOR HALFTONE FREQUENCY DETECTION

TECHNICAL FIELD

The presently disclosed embodiments relate to image processing, and more particularly to systems and methods for halftone frequency detection.

BACKGROUND

Electronic documents include various types of information, for example, grayscale or continuous tone (contone) images, halftone images of different frequencies, text/line art, etc., in different formats that is suitable for being displayed or printed. Each information type may be part of a scanned document or an original image that is often processed using any of wide variety of techniques based on their suitability in terms of processing efficiency and reproduction resolution.

The halftone images include a pattern of dots (or halftones) of varying sizes and density that create an illusion of contone images. Typically, the halftone images are divided into different classes based on their halftone frequency for accurate selection of a processing technique to reproduce scanned halftone images. For example, when the halftone frequency is, for example, below 130 cells per inch (cpi), a halftone portion is classified as a low frequency halftone. Similarly, the halftone images are also classified into middle and high frequency halftones based on predefined frequency ranges.

While simple processing techniques (e.g., halftone zone thresholding, etc.) work fine for low frequency halftone detection, the relatively higher frequency halftones typically require complex techniques (e.g., based on pattern training, image segmentation, gradient estimation, wavelet-based image decomposition, or maximum a posteriori (MAP) probability estimation, etc.) for being detected. In this regard, some of the techniques for higher halftone frequency detection are discussed in U.S. Pat. No. 6,185,335 (Feb. 6, 2001), U.S. Pat. No. 6,683,702 B1 (Jan. 27, 2004), U.S. Pat. No. 6,185,328 B1 (Feb. 6, 2001), U.S. Pat. No. 8,184,340 (May 22, 2012), U.S. Pat. No. 6,734,991 (May 11, 2004). These conventional techniques for halftone frequency detection are computationally complex and require hardware acceleration to meet divergent processing needs of different frequency halftones. In other words, multiple processors are required to implement these techniques that adversely impact the device package size, cost, and power requirements.

Therefore, there exists a need for a low-cost and computationally efficient alternative to the existing hardware assisted methods and systems for halftone frequency detection while preserving the image quality and sharpness.

SUMMARY

Embodiments of the present disclosure include systems and methods for halftone frequency detection in a halftone image having an existing halftone pattern that overlaps another halftone pattern. The present systems and methods are advantageously configured to reduce computational overheads for being implemented on a software-based platform.

One exemplary embodiment of the present disclosure discloses a system for halftone frequency detection in a halftone image. The system includes an image source, a memory unit, and a threshold-based halftone frequency (THF) detector. The image source is configured to capture a halftone image of a predetermined resolution, wherein the halftone image includes a plurality of pixels. The memory unit is configured to store a predefined first window and a predefined second window, each including a plurality of check cells and at least one processing cell. The THF detector is configured to: receive the first window, the second window, and the halftone image; determine measurement values of a plurality of predetermined statistical parameters for the plurality of pixels; assign an active value to a max variable or a min variable associated with a pixel from the plurality of pixels within a first pixel neighborhood defined by the first window based on an intensity value of the pixel being compared with a three-way threshold set including a maximum value, a minimum value, and a median value from a range of possible intensity values for the pixel, wherein the three-way threshold set is determined based on the values of the plurality of predetermined statistical parameters; estimate a first frequency estimate value based on a number of pixels having active values in the max variable within a second pixel neighborhood defined by the second window; estimate a second frequency estimate value based on a number of pixels having active values in the min variable within the second pixel neighborhood; and determine the halftone frequency based on the first frequency estimate value, the second frequency estimate value, and the predetermined resolution.

Another exemplary embodiment of the present disclosure discloses a computer-implemented method for halftone frequency detection in a halftone image generated from a print medium being scanned, the print medium includes a halftone pattern. The method comprises receiving, using a threshold-based halftone frequency (THF) detector on a computer comprising a processor and a memory, the halftone image, a predefined first window and a predefined second window, wherein the halftone image includes a plurality of pixels and has a predefined resolution; determining, using the THF detector, measurement values of a plurality of predetermined statistical parameters for the plurality of pixels; assigning, using the THF detector, an active value to a max variable and a min variable associated with a pixel from the plurality of pixels within a first pixel neighborhood defined by the first window based on an intensity value of the pixel being compared with a three-way threshold set including a maximum value, a minimum value, and a median value from a range of possible intensity values for the pixel, wherein the three-way threshold set is determined based on the values of the plurality of predetermined statistical parameters; estimating, using the THF detector, a first frequency estimate value based on a number of pixels having active values in the max variable within a second pixel neighborhood defined by the second window; estimating, using the THF detector, a second frequency estimate value based on a number of pixels having active values in the min variable within the second pixel neighborhood; and determining, using the THF detector, the halftone frequency based on the first frequency estimate value, the second frequency estimate value, and the predetermined resolution.

Yet another exemplary embodiment of the present disclosure discloses a non-transitory computer-readable medium comprising computer-executable instructions for detection of halftone frequency in a halftone image by a threshold-based halftone frequency (THF) detector, the halftone image generated from a print medium including a halftone pattern being scanned, the non-transitory computer-readable medium comprising instructions for: receiving the halftone image, a predefined first window and a predefined second window, wherein the halftone image includes a plurality of pixels and has a predefined resolution; determining measurement values of a plurality of predetermined statistical parameters for the plurality of pixels; assigning an active value to a max variable and a min variable associated with a pixel from the plurality of pixels within a first pixel neighborhood defined by the first window based on an intensity value of the pixel being compared with a three-way threshold set including a maximum value, a minimum value, and a median value from a range of possible intensity values for the pixel, wherein the three-way threshold set is determined based on the values of the plurality of predetermined statistical parameters; estimating a first frequency estimate value based on a number of pixels having active values in the max variable within a second pixel neighborhood defined by the second window; estimating a second frequency estimate value based on a number of pixels having active values in the min variable within the second pixel neighborhood; and determining the halftone frequency based on the first frequency estimate value, the second frequency estimate value, and the predetermined resolution.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

The following detailed description is made with reference to the figures. Some of the embodiments are described to illustrate the disclosure, not to limit its scope, which is defined by the claims. Those of ordinary skill in the art will recognize a number of equivalent variations in the description that follows.

Overview

Various embodiments describe systems and methods for halftone frequency detection in digital images such as a halftone image with Moiré patterns, which may be formed when a halftone image is subjected to halftoning that causes existing halftones of the image to overlap new image halftones generated due to such halftoning. The embodiments include a threshold-based halftone frequency (THF) detector that accurately estimates the halftone frequency in the halftone image. The systems are implemented with methods that follow a software-based image path for halftone frequency estimation and can be easily vectored. The embodiments estimate the halftone frequency by pixel thresholding based on pixel statistics and active pixel count in a predefined neighbourhood in the halftone image. Some advantages to the embodiments include that the implemented methods are computationally light, economical, and can be ported to a software-based platform, thereby eliminating hardware acceleration, which was a primary need in traditional halftone frequency detection techniques. The systems and methods are made suitable for various applications including, but not limited to, fine line graphic prints, computer aided design prints, architecture and design layout applications, LaserJet prints, inkjet prints, bubble jet prints, three dimensional (3D) prints, etc.

Non-Limiting Definitions

Definitions of one or more terms that will be used in this disclosure are described below without limitations. For a person skilled in the art, it is understood that the definitions are provided just for the sake of clarity, and are intended to include more examples than just provided below.

In various embodiments of the present disclosure, definitions of one or more terms that will be used in the document are provided below.

A "halftone frequency" is used in the present disclosure in the context of its broadest definition. The halftone frequency may refer to the number of dots per linear inch measured along an axis of each row of pixels in a halftone image. It may be also termed as screen frequency or screen ruling.

An "image source" is used in the present disclosure in the context of its broadest definition. The image source may refer to a physical or software entity that can read or capture a digital image to provide image data to an image processing unit. Examples of the image source may include a scanner, camera, or any similar image capture or input terminal.

A "communication channel" is used in the present disclosure in the context of its broadest definition. The communication channel as used herein may constitute any known, related art, and/or later developed pathway for communicating data from one location to another.

"De-screening" is used in the present disclosure in the context of its broadest definition. The de-screening may refer to methods to remove dots in a halftone pattern of an image to produce a continuous tone version of the image.

A "printer" and "print device" are used interchangeably in the present disclosure in the context of its broadest definition. The printer as used herein encompasses any apparatus, such as a digital copier, bookmaking machine, facsimile machine, multi-function machine, and the like, which performs a print outputting function for any purpose.

An "electronic image" is used in the present disclosure in the context of its broadest definition. The electronic image may refer to any electronic media content that is intended to be used in an electronic form or transmitted to a marking engine for printing. Exemplary electronic image file types may include various digital images, text, and mixed content files, such as portable document format (PDF), TXT, DOC, TIFF, BMP, GIF, JPEG, and other common page description language (PDL) file and document formats, such as Adobe® Postscript®. In some instances, pixels in the electronic image may be formatted as binary image data, which is single bit or bi-level, i.e., with only two possible values. More particularly, pixel values may be either ON (e.g., value=1 or 255) denoting an active pixel, or OFF (e.g., value=0) denoting an inactive pixel.

Exemplary Embodiments

Figure 1:
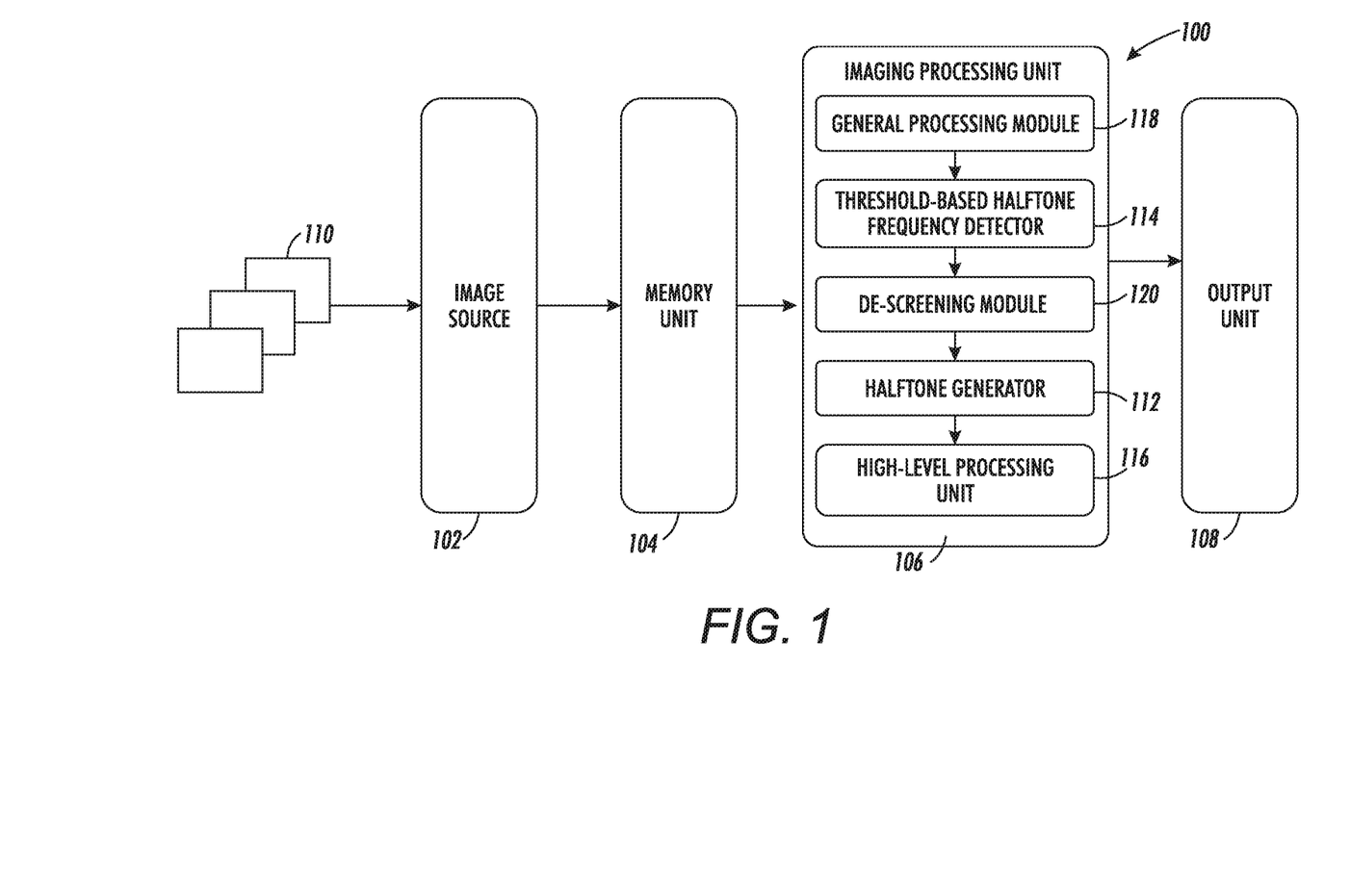
FIG. 1 illustrates a system for implementing an exemplary threshold-based halftone frequency (THF) detector, according to an embodiment of the present disclosure.

FIG. 1 illustrates a system 100 for implementing an exemplary threshold-based halftone frequency (THF) detector, according to an embodiment of the present disclosure. One embodiment of an imaging system 100 suitable for one or more novel aspects of the present disclosure is illustrated. The system 100 includes an image source 102, a memory unit 104, an image/imaging processing unit 106, and an output unit 108. The image source 102 is used to generate image data that is supplied to the image processing system 106, which produces output data for rendering by the output unit 108. The output unit 108 may include a print engine, for example, a xerographic engine, however any other suitable print engine known in the art, related art, or developed later may be used. The novel aspects presented herein are directed toward aspects of image processing unit 106. In particular, the novel aspects are directed to halftone frequency detection in a halftone image received by the image processing unit 106. It will be appreciated by those having ordinary skill in the art that the rendering of an image into a printable or displayable output format may be accomplished at any of a number of locations, for example, within the image processing unit 106 or the output unit 108.

The image source 102 may scan a physical print medium 110 such as a paper at a predetermined resolution, for example, 300 dots per inch (DPI), 600 DPI, and so on, to generate a scanned image. The image source 102 may include any of a variety of devices known in the art, related art, or developed later including cameras, scanners, and medical imaging sources, each of which may include a microcontroller. In one example, the image source 102 may include a color video camera such as a high-definition (HD) webcam with at least one imaging channel for capturing color values for pixels corresponding generally to primary visible colors (typically Red, Green, Blue (RGB)). In a second example, the image source 102 may include an infrared (IR) camera with at least one imaging channel for measuring pixel intensity values in the near-infrared (NIR) wavelength range. In a third example, the image source 102 may include a hybrid device capable of capturing both color and NIR video or image. In a fourth example, the image source 102 may include a multispectral or hyperspectral camera device capable of capturing images at multiple wavelength bands. In some embodiments, the image source 102 may include IR or NIR illuminators so that an image may be correctly captured even in dark or low light conditions.

The physical print medium 110 may include a halftone pattern associated with an image, text, or a combination thereof. As a result, the generated scanned image provides an electronic image that includes a copy of the halftone pattern, hereinafter referred to as original halftone pattern, present on the physical print medium 110. Such electronic image including the original halftone pattern may be referred to as a halftone image. In some embodiments, the image source 102 may receive a halftone image from another computing device or a data repository (not shown) for being printed or displayed. The scanned image may be communicated to one or more connected devices such as the memory unit 104 over a network (not shown) having at least one communication channel. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

The memory unit 104 may comprise any computer-readable medium known in the art, related art, or developed later including, for example, a single processor or multiple processors operatively connected together, volatile memory (e.g., RAM), non-volatile memory (e.g., flash memory, etc.), disk drive, etc., or any combination thereof. The memory unit 104 may receive and store the electronic image(s) captured by the image source 102. In some embodiments, the memory unit 104 may receive an electronic halftone image directly or indirectly from a storage media (e.g., a compact disk, a flash drive, a memory card, etc.); a computing device (e.g., a mobile phone, a server, etc.) through various interfaces (e.g., Universal Serial Bus (USB) port, Peripheral Component Interconnect (PCI) port, etc.); and so on over the network. In one embodiment, the memory unit 104 may store one or more predefined windows for use by the THF detector 114 to define a pixel neighbourhood for processing, discussed later in greater detail. The memory unit 104 may also store intensity values of pixels in the scanned image with respect to the windows and a set of bitmap codes for generation of halftone patterns. The memory unit 104 may be in communication with the image processing unit 106 including a general processing module 118, a halftone generator 112, a threshold-based halftone frequency (THF) detector, a de-screening module 120, and a high-level processing unit 116.

The image processing unit 106 may represent any type of computing device, such as the computing device described above that is capable of configuring and processing the methods of the embodiments. The image processing unit 106 may be implemented as a standalone and dedicated device including hardware and installed software, where the hardware is compatible with the requirements and/or functionality of the software. Alternatively, the image processing unit 106 may be implemented as a software application or a device driver. In some other embodiments, the image processing unit 106 may be configured to expose its computing environment or operating code to a user, and may include related art I/O devices, such as a keyboard or display. The image processing unit 106 of some embodiments may, however, include software, firmware, or other resources that support remote administration and/or maintenance of the image processing unit 106.

In further embodiments, the image processing unit 106 either in communication with networked devices, such as the memory unit 104 and the output unit 108, or independently, may have video, voice, and data communication capabilities (e.g., unified communication capabilities) by being coupled to or including, the image source 102, various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware, in any combination thereof. In some embodiments, the image processing unit 106 may comprise or implement one or more real time protocols (e.g., session initiation protocol (SIP), H.261, H.263, H.264, H.323, etc.) and non-real time protocols known in the art, related art, or developed later to facilitate data transfer among the image source 102, the memory unit 104, the image processing unit 106, the output unit 108, or any other network device. The image processing unit 106 may generate a defect-free halftone image using a threshold-based halftone frequency detection and transmit the generated defect-free halftone image to the output unit 108. In some embodiments, the image processing unit 106 may store the defect-free halftone image in the memory unit 104.

The general processing module 118 receives or fetches the scanned image and its associated data from the memory unit 104, the image source 102, or any networked device. The scanned image may be hereinafter referred to as halftone image because the scanned image includes a halftone pattern. In one embodiment, the general processing module 118 may be configured to convert communications, which may include instructions, queries, data, etc., from, for example, the image source 102, the memory unit 104, or any connected devices/modules, into appropriate formats to make these communications compatible between the THF detector 114 and the output unit 108, or vice versa. Consequently, the general processing module 118 may allow implementation of the output unit 108 using different technologies or by different organizations, e.g., a third-party vendor, managing the output unit 108 or associated services using a proprietary technology.

The THF detector 114 may be implemented by way of a single device (e.g., a computing device, a processor or an electronic storage device) or a combination of multiple devices that are operatively connected or networked together in a single location or that are separated by large distances. In some embodiments, the THF detector 114 may be a hardware device including processor(s) executing machine readable program instructions for analyzing data, and interactions between the THF detector 114 or the memory unit 104, and the output unit 108. The "hardware" may comprise a combination of discrete components, an integrated circuit, an application-specific integrated circuit (ASIC), a field programmable gate array (FPGA), a digital signal processor, or other suitable hardware. The "software" may comprise one or more objects, agents, threads, lines of code, subroutines, separate software applications, two or more lines of code or other suitable software structures operating in one or more software applications or on one or more processors. These processors (not shown) may include, for example, microprocessors, microcomputers, microcontrollers, digital signal processors, central processing units, state machines, logic circuits, and/or any devices that can manipulate signals based on operational instructions. Among other capabilities, the processors may be configured to fetch and execute computer readable instructions in a dedicated or shared memory associated with the THF detector 114 for performing tasks such as signal coding, data processing input/output processing, power control, and/or other functions.

In one embodiment, the THF detector 114 may include, in whole or in part, a software application working alone without any additional hardware resources such as preprogrammed ASIC or FPGA to provide hardware acceleration. Such software applications may be executed by the processors on a common hardware platform; or emulated in a virtual environment. Some aspects of the THF detector 114 may leverage known, related art, or later developed off-the-shelf software. Other embodiments may comprise the THF detector 114 being integrated or in communication with a mobile switching center, network gateway system, Internet access node, application server, IMS core, service node, or some other communication systems, including any combination thereof. In some embodiments, the THF detector 114 may be integrated with or implemented as a wearable device including, but not limited to, a fashion accessory (e.g., a wrist band, a ring, etc.), a utility device (a hand-held baton, a pen, an umbrella, a watch, etc.), a body clothing, or any combination thereof.

The THF detector 114 may be preconfigured or dynamically configured to automatically determine the halftone frequency in the scanned image using the predefined windows for pixel thresholding based on pixel statistics and active pixel count. The THF detector 114 may include a variety of known, related art, or later developed interface(s), including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

In another embodiment, the THF detector 114 may be preconfigured or dynamically configured to operate the halftone generator 112 and the high-level processing unit 116 either standalone or in tandem with each other, in addition to the memory unit 104 and the output unit 108, via a server (not shown) over the network. The server may be installed, integrated, or operatively associated with the THF detector 114. The server may be implemented as any of a variety of computing devices including, for example, a general purpose computing device, multiple networked servers (arranged in clusters or as a server farm), a mainframe, or so forth.

In other embodiments, the THF detector 114 may be installed on or integrated with any network appliance (not shown) configured to establish the network between the THF detector 114 and other devices such as the memory unit 104 and the output unit 108. At least one of the THF detector 114 and the network appliance may be capable of operating as or providing an interface to assist exchange of software instructions and data between the memory unit 104, modules of the image processing unit 106, and the output unit 108. In some embodiments, the network appliance may be preconfigured or dynamically configured to include the THF detector 114 integrated with other devices. For example, the THF detector 114 may be integrated with the image source 102 or any other device (not shown) connected to the network. The image source 102 may include a module (not shown), which enables the THF detector 114 for being introduced to the network appliance, thereby enabling the network appliance to invoke the THF detector 114 as a service. Examples of the network appliance include, but are not limited to, a DSL modem, a wireless access point, a router, a base station, and a gateway having a predetermined computing power sufficient for implementing the THF detector 114.

In one embodiment, the THF detector 114 may detect a frequency of dots or halftones in the original halftone pattern, hereinafter referred to as original halftone frequency, in the scanned image by applying localized pixel thresholding based on pixel statistics and count of active pixels in predetermined neighbourhood block(s). In one embodiment, the THF detector 114 determines a measure of statistical parameters, for example, mean and standard deviation of pixel intensities, in a first local neighbourhood of every pixel. In a grayscale halftone image, a pixel intensity value may refer to a single number that represents the brightness of the pixel. The pixel intensity value may be represented as an 8-bit integer providing a range of possible values from 0 to 255. In one example, '0' may refer to black color, '255' may refer to white color, and the intensity values between '0' and '255' may refer to different shades of gray color. Similarly, in a color halftone image, a pixel intensity value may refer to brightness of the inherent color.

The THF detector 114 may select the first local neighbourhood of pixels using a window of predefined size stored in the memory unit 104. In the first local neighbourhood, each pixel may be assigned an active value or an inactive value based on a predefined function of the statistical parameters and a three-way threshold set. The three-way threshold set may refer to a set of threshold values that correspond to a maximum value, a minimum value, and a median value from a range of possible intensity values for the pixel. The THF detector 114 may use the assigned values to determine maxima pixel and minima pixels based on the three-way threshold set within the first local neighborhood. A pixel may be referred to as a maxima pixel if the intensity of the pixel is above a predefined high threshold value. Similarly, a pixel may be referred to as a minima pixel if the intensity of the pixel is below a predefined low threshold value, which may be relatively less than the high threshold value. Both the high threshold value and the low threshold value may belong to the three-way threshold set. In one embodiment, the high threshold value may correspond to the maximum value and the low threshold value may correspond to the minimum value in the three-way threshold set. The THF detector 114 determines a first frequency estimate value based on the number of active pixels having value '1' associated with the maxima pixels in a second local neighbourhood of pixels using a second window of a relatively bigger size than the first window. In one embodiment, the second local neighbourhood may be relatively larger than the first local neighbourhood of pixels. Similarly, the THF detector 114 determines a second frequency estimate value based on the number of active pixels having value '1' associated with the minima pixels in the second local neighbourhood of pixels. In one example, the second local neighbourhood of pixels may be selected using a predefined window of 16×16 pixels, i.e., the second window, stored in the memory unit 104. Further, the THF detector 114 estimates the original halftone frequency based on the (1) calculated first frequency estimate value, (2) the second frequency estimate value, and (3) a resolution at which the physical print medium 110 was scanned by the image source 102, i.e., a device resolution. The determined original halftone frequency may be stored in the memory unit 104 by the THF detector 114. The operation of THF detector 114 is discussed below in greater detail with respect to the description of FIG. 2.

The de-screening module 120 may be configured to filter the scanned image based on the original halftone frequency estimated by the THF detector 114. In one embodiment, the de-screening module 120 may apply a separate halftone screen for each grayscale or color channel in a color model such as CMYK (Cyan, Magenta, Yellow, Key, or Black) and RGB (Red, Green, Blue) implemented on the scanned image to generate a new halftone pattern. The new halftone pattern may be represented as a new pattern of dots, where the dot sizes and spacing between dots may vary based on bitmap codes generated by a bitmap generator (not shown). The bitmap codes define the halftone screens for desired dot patterns. In some embodiments, the desired dot patterns may be inputted to the bitmap generator by a user using any of the known input devices, for example, a keyboard (not shown).

Each of the halftone screens operate at distinct screen angles and screen frequencies based on the estimated original halftone frequency to generally avoid appearance of the Moiré effect in the halftone image. This process of a new halftone screen having a frequency that is different from the original halftone frequency being employed by the halftone generator may be referred to as the de-screening process. The de-screening process suppresses the original halftone pattern present in the scanned image and provides a de-screened image that has a different pattern of dots devoid of any Moiré effect when the scanned image is halftoned. Therefore, the computation of the original halftone frequency is critical for detection and removal of the original halftone pattern for a defect-free reproduction of the scanned image. The de-screening module 120 may communicate the de-screened image to the halftone generator 112 or store the de-screened image in the memory 104. The halftone generator 112 may receive or fetch the de-screened image and the estimated original halftone frequency from the memory unit 104. The halftone generator 112 may be configured to generate halftone cells for the de-screened image based on the received image data (including the original halftone frequency) and bitmap codes using any of a variety of predefined halftone screens known in the art, related art, or developed later. The halftone generator 112 may communicate the de-screened halftone image to the high-level processing unit or store the de-screened halftone image in the memory 104.

The high-level processing unit 116 may be configured to receive or fetch the de-screened halftone image from the halftone generator 112 or the memory unit 104. The high-level processing unit 116 may also receive the estimated original halftone frequency from the THF detector 114 or the memory unit 104. The high-level processing unit 116 may use the estimated original halftone frequency in combination with frequencies of other components such as text in the de-screened halftone image to segment the image by filtering into low frequency, high frequency, or any other frequency components. These frequency components may be used to filter out the original halftone pattern to avoid spatial artifacts such as Moiré effect when the image is halftoned using any of the variety of techniques known in the art, related art, or developed later and generate an artifact-free halftone image. Such filtered halftone image may be sent to the output unit 108 or stored in the memory unit 104.

The output unit 108 may be in communication with the THF detector 114 via the high-level processing unit 116 over a wired or wireless connection to receive the filtered halftone image from the high-level processing unit 116 or the memory unit 104. Examples of the output unit 108 may include, but without limitation, a handling device such as a print head controller or print engine; a storage device such as the memory unit 104; or any computing device such as a laptop, a mobile phone, and a multi-function device. In one embodiment, the output unit 108 may be configured to store, process, or print the filtered halftone image. For example, the output unit 108 may be a printer including one or more print or marking engines configured to print an electronic image, with or without de-screening or filtering as programmed. The marking engines may be configured for various printing technologies, for example, xerographic, ink-jet (bubble jet), laser, offset, solid-ink, dye sublimation, or the like. One having ordinary skill in the art will understand that these printing technologies are merely exemplary and others may similarly be used.

Figure 2:
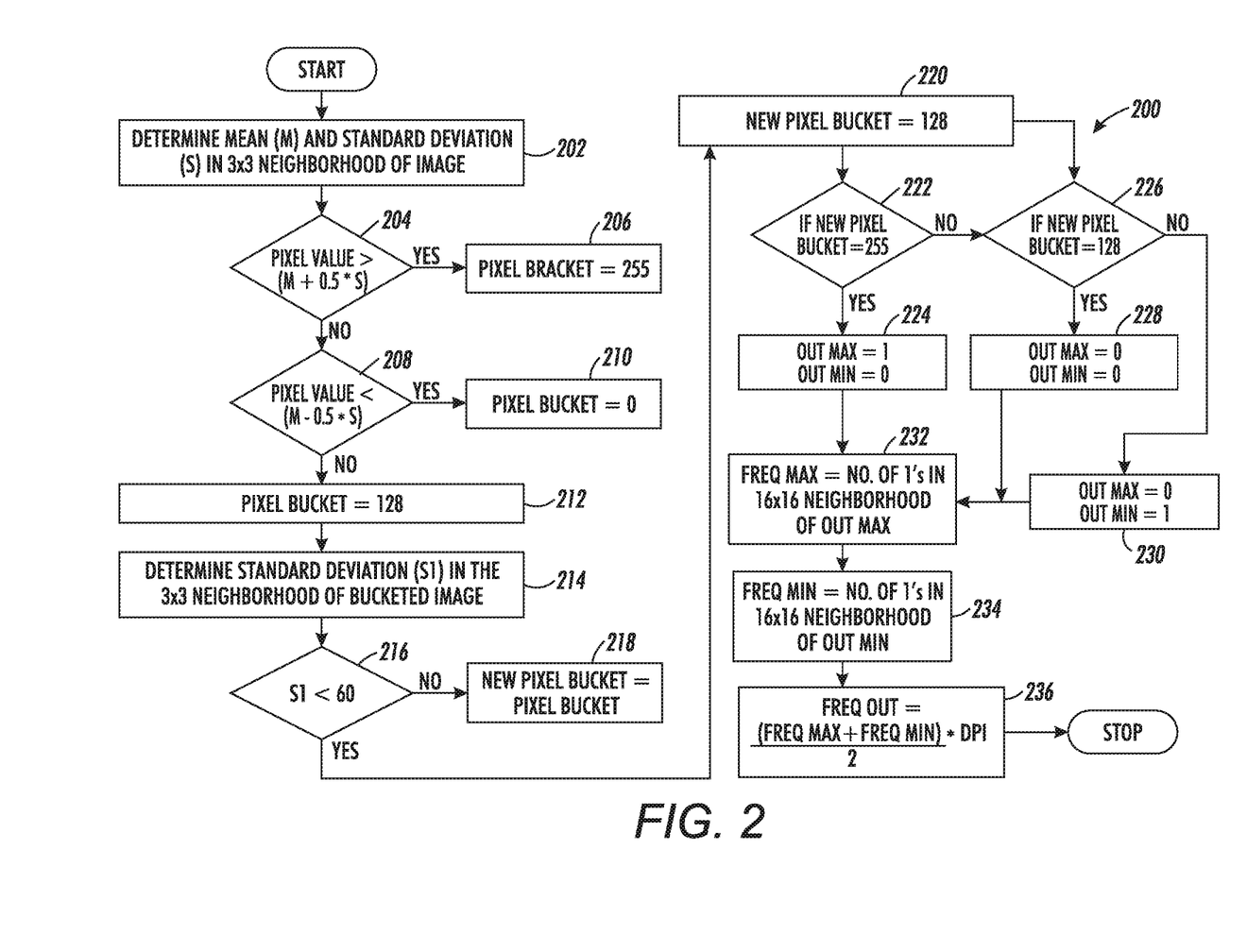
FIG. 2 is a flowchart that illustrates an exemplary method for detecting halftone frequency, according to an embodiment of the present disclosure.

FIG. 2 is a flowchart that illustrates an exemplary method for detecting halftone frequency, according to an embodiment of the present disclosure. The exemplary method 200 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 200 is described is not intended to be construed as a limitation, and any number of the described method blocks may be combined or otherwise performed in any order to implement the method 200, or an alternate method. Additionally, individual blocks may be deleted from the method 200 without departing from the spirit and scope of the present disclosure described herein. Furthermore, the method 200 may be implemented in any suitable hardware, software, firmware, or combination thereof, that exists in the related art or that is later developed.

The depicted method 200 may be performed by the THF detector 114 of the image processing unit 106. In one embodiment, the method 200 implements the individual pixel thresholding, based on pixel statistics and a count of active pixels in a predefined neighbourhood of pixels. The method 200 determines a two-dimensional (2D) halftone frequency across rows and columns of pixels in the predefined neighbourhood with respect to a processing pixel. The THF detector 114 may estimate the halftone frequency based on pixel statistics, count of active pixels, and screen resolution. For the purpose of determining, the THF detector 114 scans a set of pixels based on a predefined window and determines the halftone frequency by dividing the halftone image into a fixed-size pixel matrix identified by the predefined window.

The THF detector 114 may implement one or more predefined windows, each processing one or more pixels in a halftone image. A window may refer to a matrix of cells that defines a region of interest in an electronic image, such as the scanned halftone image, where predetermined rules may be applied. The size of the matrix of cells, or window size, may be configured to provide appropriate control of localized estimation of halftone frequency while maintaining an optimal trade-off between performance and accuracy. In one embodiment, the THF detector 114 may implement different window sizes for (1) localized detection of pixel statistics to estimate maxima pixels (MAXs) and minima pixels (MINs) based on a comparison between pixel intensities and a three-way threshold set in a first pixel neighborhood, and (2) section-wise estimation of first frequency value and a second frequency value based on active values in a second pixel neighborhood to save processing overheads in the halftone image. For example, the THF detector 114 may implement a window 302 (shown in FIG. 3) as a 3×3 matrix, hereinafter also referred to as 3×3 window, comprising three rows and three columns for localized detection of pixel statistics. The window 302 has nine cells including one processing cell X and eight check cells, each cell being representative of one or more pixels when the window 302 is associated with the halftone image. Each check cell may be used by the THF detector 114 to detect the state of a corresponding pixel with respect to the processing cell X.

Similarly, the THF detector 114 may also implement a 16×16 window such as a window 304 (shown in FIG. 3) comprising sixteen rows and sixteen columns for section-wise estimation of the maximum and minimum halftone frequencies. In one embodiment, the window 304 may have 255 check cells and at least one processing cell X at a predefined location in the window 304. The location of the processing cell X may be kept closest to the matrix center, or at the matrix center, for a wider data availability while determining the halftone frequencies. For example, the processing cell X may be located at the coordinate (8, 8) of the window 304. The coordinate (8, 8) may refer to the eighth row and eighth column of the window 304. The processing cell X may be associated with each pixel of the halftone image to detect neighboring pixel values comprising, for example, one or more active pixels, which may refer to white pixels in the halftone image.

In some other embodiments, windows of other suitable sizes and orientation may be contemplated based on (1) size and orientation of the halftone image, and (2) an intended trade-off between performance and accuracy in halftone frequency detection methods discussed here. These methods of halftone frequency detection/estimation are computationally light and can be implemented on a software-based platform without the need of any additional hardware acceleration.

Figure 3:
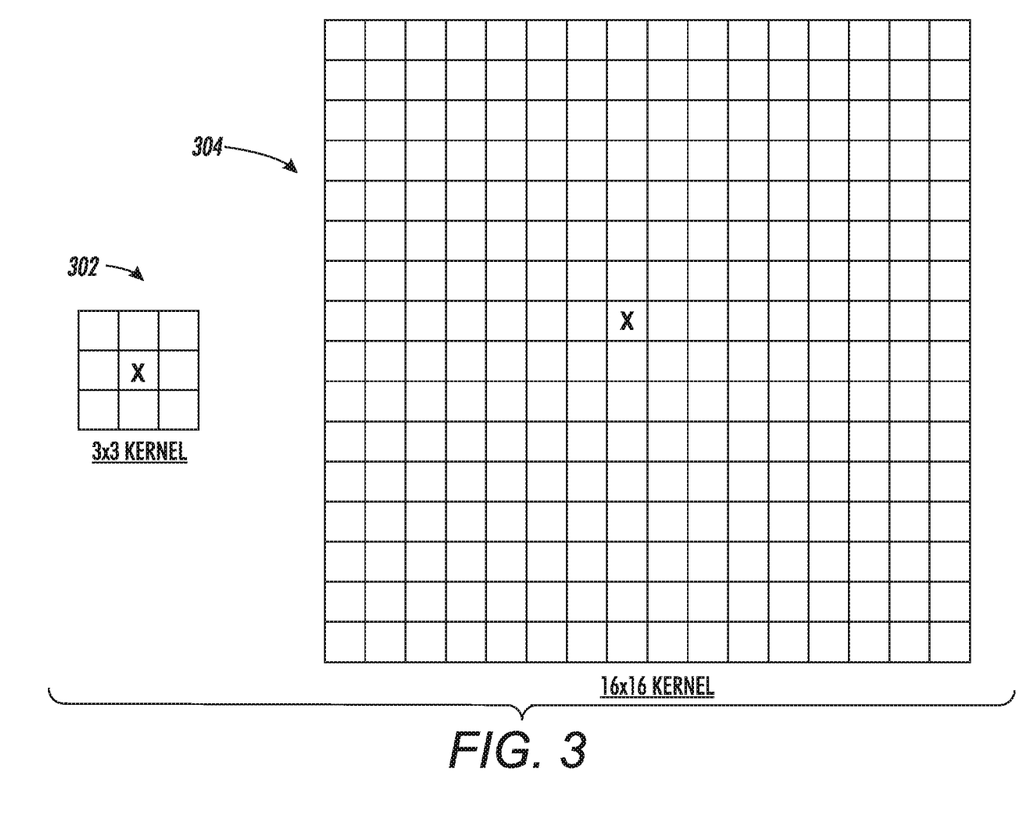
FIG. 3 illustrates exemplary windows used by the THF detector of FIG. 1, according to an embodiment of the present disclosure.

In the predefined windows such as the windows 302 and 304, each row may represent a memory space that is 8-bit wide in the memory unit 104. Each cell (e.g., cell X) is an 8-bit wide word that may be shifted on pixel-by-pixel basis in the halftone image to obtain specific locations. In some embodiments, the THF detector 114 may change the window orientation based on the orientation of the halftone image. For example, the THF detector 114 may implement a 5×3 window (e.g., representative landscape orientation) and transpose it into a 3×5 window having three rows and five columns for the halftone image in a portrait orientation. Other embodiments may configure the window into various suitable sizes such as 6×7 matrix (i.e., having six rows and seven columns), 8×7 matrix (i.e., having eight rows and seven columns), and 9×9 matrix (i.e., having nine rows and nine columns) being implemented by the THF detector 114. One ordinarily skilled in the art will understand that the window may be implemented to have (i) a relatively smaller size and (ii) the number of rows being lesser than or same as the number of columns to improve the computational efficiency.

At 202, the THF detector 114 may apply the window 302 to the halftone image with a processing cell X of the window 302 being positioned on a pixel to be processed. After positioning the processing cell X over an image pixel, the remaining cells or check cells of the 3×3 window 302 that are located outside the halftone image may undergo bit stuffing. According to the bit stuffing method, the THF detector 114 may input a dummy data bit, for example, a zero bit, into the variables for cells located outside the halftone image. The dummy data bit indicates a value for non-relevant image pixels. Such bit stuffing allows appropriate computation of the pixel statistics. However, a person ordinarily skilled in the art may implement other suitable methods known in the art, related art, or developed later for computation of pixel statistics within a region of interest in the halftone image for halftone frequency determination. The processing cell X may be shifted on a pixel-by-pixel basis by the THF detector 114 for analyzing pixels in the halftone image. In one embodiment, the THF detector 114 determines mean and standard deviation of luminance values or intensities of each pixel in the pixel neighbourhood defined by the window 302.

At 204, in one embodiment, the THF detector 114 determines the value of a predefined statistical function shown in Equation 1 based on the calculated mean (M) and standard deviation (S) of the pixel intensity values in the pixel neighbourhood defined by the window 302.

$$\text{Statistical function} = (M + 0.5 * S) \qquad (1)$$

The statistical function of equation 1 provides a measure to determine pixels having high intensities, e.g., corresponding to white pixels, in the pixel neighbourhood defined by a window, such as the window 302. The statistical function may be based on the calculated values of mean and standard deviation within the pixel neighbourhood defined by the window 302. In some embodiments, the statistical function of equation 1 may be based on the calculated values of mean and sum of absolute differences of the pixels from the mean in a pixel neighborhood defined by window 302. However, one having ordinary skill in the art may also contemplate the statistical function of equation 1 being based on other suitable statistical parameters known in the art, related art, or developed later.

In one embodiment, the THF detector 114 may detect and store an intensity value of a pixel at the processing cell X of the window 302 in a variable 'pixel value' and compare the stored value with the value of statistical function of equation 1. Based on the comparison, the image pixel at the processing cell X may be associated with a predefined value, i.e., '255' if the stored pixel intensity value is greater than the value of statistical function in equation 1. The associated value of '255' may be stored in a variable 'pixel bucket'. As each image pixel is of 8-bit, a value of '255' may represent the brightest or active value, for example, indicative of white color at 206. However, if the pixel value is not greater than the value of statistical function in equation 1, the THF detector 114 moves to 208.

At 208, the THF detector 114 may determine the value of another predefined statistical function shown in equation 2 that defines the range of pixel values that are close to the mean value from the negative side on a predefined axis, for example, x-axis. The statistical function, i.e., M−0.5*S, in equation 2 may also be based on the calculated values of mean (M) and standard deviation (S) within the pixel neighbourhood defined by the window 302. In some embodiments, the statistical function in equation 2 may be based on the calculated values of mean and absolute differences of the mean. However, one having ordinary skill in the art may also contemplate the statistical function in equation 2 being based on other suitable statistical parameters known in the art, related art, or developed later. Subsequently, the THF detector 114 may compare the pixel value (stored in the variable 'pixel value') at the processing cell X of the window 302 with the value of statistical function in equation 2.

$$PIXEL\ VALUE < (M - 0.5 * S) \quad (2)$$

Based on the comparison, the image pixel at the processing cell X is associated with a predefined value, for example, zero '0' if the pixel colour intensity is less than the value of statistical function in equation 2. The associated value '0' may be stored in the variable 'pixel bucket'. In one embodiment, as each image pixel is of 8-bit, a value of '0' may represent the darkest or inactive value, for example, indicative of black color at 210. However, if the pixel value is not less than the value of statistical function in equation 2, the THF detector 114 may associate a predefined value of '128' to the pixel and accordingly update the value stored in the variable 'pixel bucket' at 212. In one embodiment, the threshold value of '128' may be used to represent a grayscale value in the halftone image.

At 214, the THF detector 114 may again determine the standard deviation (S1) for each image pixel within the neighbourhood defined by the window 302 after the predefined values of '0', '128', or '255' have been assigned to each pixel in the halftone image.

At 216, the THF detector 114 may compare the calculated standard deviation (S1) with a predetermined value that is indicative of whether or not the image pixel is associated with a halftone pattern. In one embodiment, THF detector 114 may check if the calculated standard deviation (S1) is less than 60. The value of S1 being less than 60 may be indicative of pixels not relevant for being counted. Therefore, if S1 is greater than or equal to 60, the pixel value may be kept unchanged at 218 and the pixel value stored in the variable 'pixel bucket' may be copied to a new variable 'new pixel bucket'. However, if the value of S1 is greater than, or in some embodiments, equal to 60, then a predefined value of '128' may be stored in the variable 'new pixel bucket', at 220. After the S1 comparison, the threshold value of '128' may represent a grayscale value that is indicative of a possible merging of the halftone patterns.

At 222, the THF detector 114 may check if the pixel value stored in the variable 'new pixel bucket' is set to the predefined value of '255' (i.e., white pixel), '128' (i.e., grayscale pixel), or '0' (i.e., black pixel). If the pixel value stored in the variable 'new pixel bucket' is '255', the THF detector 114 may identify the corresponding pixel as a maxima pixel for which the THF detector 114 assigns predefined values '1' and '0' in variables 'out max' out min', respectively, at 224.

Similarly, at 226, the THF detector 114 checks if the pixel value stored in the variable 'new pixel bucket' is '128' or not equal to '255'. If this is true, the THF detector 114 may identify the pixel as minima pixel and assign a value '0' to the both the variables 'out max' and 'out min' at 228. However, if the value stored in the variable 'new pixel bucket' has neither the value '255' nor the value '128', the THF detector 114 assigns the value '0' to the variable 'out max' and the value '1' to the variable 'out min', at 230. Hence, the values '128' and '255' of the variable 'new pixel bucket' form a three-way threshold set and assist to assign corresponding values to the variables 'out min' and 'out max' for the pixels.

At 232, the THF detector 114 may apply the window 304 (shown in FIG. 3) having a size of 16×16 cells to the image pixels and determine a first frequency estimate value based on the assigned values for the identified maxima pixels within the pixel neighbourhood defined by the window 304. The assigned value of the pixels may be determined from the respective value stored in the variable 'out max' for each pixel by the THF detector 114. In one embodiment, the THF detector 114 may calculate the number of image pixels for which the variable 'out max' has been assigned the value '1' within the 16×16 pixel neighbourhood defined by the window 304 to determine the first frequency estimate value.

Similarly, at 234, the THF detector 114 may apply the window 304 to the image pixels and determine the value of second frequency estimate value based on the assigned values for the identified minima pixels from the variable 'out min' for each of the image pixels within the 16×16 pixel neighbourhood. The THF detector 114 may calculate the number of image pixels for which the variable 'out min' has the value '1' within the 16×16 pixel neighbourhood to determine the second frequency estimate value.

At 236, the THF detector 114 may calculate the halftone frequency in that 16×16 pixel neighbourhood defined by the window 304 based on equation 3.

$$FREQ\ OUT = \left(\frac{(FREQ\ MAX + FREQ\ MIN)}{2}\right) * DPI \quad (3)$$

In equation 3, 'FREQ OUT' refers to the halftone frequency, 'FREQ MAX' refers to the first frequency estimate value; 'FREQ MIN' refers to the second frequency estimate value; and 'DPI' refers to the device resolution, for example, the resolution at which the physical print medium 110 was scanned by the image source 102. Values of each of the parameters, namely, ' FREQ MAX', 'FREQ MIN', and 'DPI' may be stored and retrieved from the memory unit 104 by the THF detector 114.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing," or "computing," or "determining," or "or receiving," or "estimating," or "assigning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A system for halftone frequency detection in a halftone image, the system comprising:
    an image source configured to capture a halftone image of a predetermined resolution, wherein the halftone image includes a plurality of pixels;
    a memory unit configured to store a predefined first window and a predefined second window, each including a plurality of check cells and at least one processing cell; and
    a threshold-based halftone frequency (THF) detector configured to:
    receive the first window, the second window, and the halftone image;

determine measurement values of a plurality of predetermined statistical parameters for the plurality of pixels;

assign an active value to a max variable or a min variable associated with a pixel from the plurality of pixels within a first pixel neighborhood defined by the first window based on an intensity value of the pixel being compared with a three-way threshold set including a maximum value, a minimum value, and a median value from a range of possible intensity values for the pixel, wherein the three-way threshold set is determined based on the values of the plurality of predetermined statistical parameters;

estimate a first frequency estimate value based on a number of pixels having active values in the max variable within a second pixel neighborhood defined by the second window;

estimate a second frequency estimate value based on a number of pixels having active values in the min variable within the second pixel neighborhood; and determine the halftone frequency based on the first frequency estimate value, the second frequency estimate value, and the predetermined resolution.

2. The system according to claim 1, wherein the second window has a size greater than that of the first window.

3. The system according to claim 2, wherein the first window is a 3×3 matrix of cells and the second window is a 16×16 matrix of cells.

4. The system according to claim 1, wherein the plurality of predetermined statistical parameters includes at least a combination of a mean pixel intensity with a standard deviation of the mean or absolute differences of the mean.

5. The system according to claim 1, wherein the intensity value is an 8-bit integer providing a range of possible intensity values from 0 to 255.

6. The system according to claim 5, wherein the maximum value, the minimum value, and the median value corresponds to 255, 0, and 128, respectively, from the range of possible intensity values.

7. A computer-implemented method for halftone frequency detection in a halftone image generated from a print medium being scanned, the print medium includes a halftone pattern, the computer implemented method comprising:

receiving, using a threshold-based halftone frequency (THF) detector on a computer comprising a processor and a memory, the halftone image, a predefined first window and a predefined second window, wherein the halftone image includes a plurality of pixels and has a predefined resolution;

determining, using the THF detector, measurement values of a plurality of predetermined statistical parameters for the plurality of pixels;

assigning, using the THF detector, an active value to a max variable and a min variable associated with a pixel from the plurality of pixels within a first pixel neighborhood defined by the first window based on an intensity value of the pixel being compared with a three-way threshold set including a maximum value, a minimum value, and a median value from a range of possible intensity values for the pixel, wherein the three-way threshold set is determined based on the values of the plurality of predetermined statistical parameters;

estimating, using the THF detector, a first frequency estimate value based on a number of pixels having active values in the max variable within a second pixel neighborhood defined by the second window;

estimating, using the THF detector, a second frequency estimate value based on a number of pixels having active values in the min variable within the second pixel neighborhood; and determining, using the THF detector, the halftone frequency based on the first frequency estimate value, the second frequency estimate value, and the predetermined resolution.

8. The computer-implemented method according to claim 7, wherein the second window has a size greater than that of the first window.

9. The computer-implemented method according to claim 8, wherein the first window is a 3×3 matrix of cells and the second window is a 16×16 matrix of cells.

10. The computer-implemented method according to claim 7, wherein the plurality of predetermined statistical parameters includes at least a combination of a mean pixel intensity with a standard deviation of the mean or sum of absolute differences of the pixels from the mean in a pixel neighborhood.

11. The computer-implemented method according to claim 7, wherein the intensity value is an 8-bit integer providing a range of possible intensity values from 0 to 255.

12. The computer-implemented method according to claim 11, wherein the maximum value, the minimum value, and the median value corresponds to 255, 0, and 128, respectively, from the range of possible intensity values.

13. A non-transitory computer-readable medium comprising computer-executable instructions for detection of halftone frequency in a halftone image by a threshold-based halftone frequency (THF) detector, the halftone image generated from a print medium including a halftone pattern being scanned, the non-transitory computer-readable medium comprising instructions for:

receiving the halftone image, a predefined first window and a predefined second window, wherein the halftone image includes a plurality of pixels and has a predefined resolution;

determining measurement values of a plurality of predetermined statistical parameters for the plurality of pixels;

assigning an active value to a max variable and a min variable associated with a pixel from the plurality of pixels within a first pixel neighborhood defined by the first window based on an intensity value of the pixel being compared with a three-way threshold set including a maximum value, a minimum value, and a median value from a range of possible intensity values for the pixel, wherein the three-way threshold set is determined based on the values of the plurality of predetermined statistical parameters;

estimating a first frequency estimate value based on a number of pixels having active values in the max variable within a second pixel neighborhood defined by the second window;

estimating a second frequency estimate value based on a number of pixels having active values in the min variable within the second pixel neighborhood; and determining the halftone frequency based on the first frequency estimate value, the second frequency estimate value, and the predetermined resolution.

14. The non-transitory computer-readable medium according to claim 13, wherein the second window has a size greater than that of the first window.

15. The non-transitory computer-readable medium according to claim 14, wherein the first window is a 3×3 matrix of cells and the second window is a 16×16 matrix of cells.

16. The non-transitory computer-readable medium according to claim 13, wherein the plurality of predetermined statistical parameters includes at least a combination of a mean pixel intensity with a standard deviation or sum of absolute differences of the pixels from the mean in a pixel neighborhood.

17. The non-transitory computer-readable medium according to claim 13, wherein the intensity value is an 8-bit integer providing a range of possible intensity values from 0 to 255.

18. The non-transitory computer-readable medium according to claim 17, wherein the maximum value, the minimum value, and the median value corresponds to 255, 0, and 128, respectively, from the range of possible intensity values.

* * * * *